Figure 1:
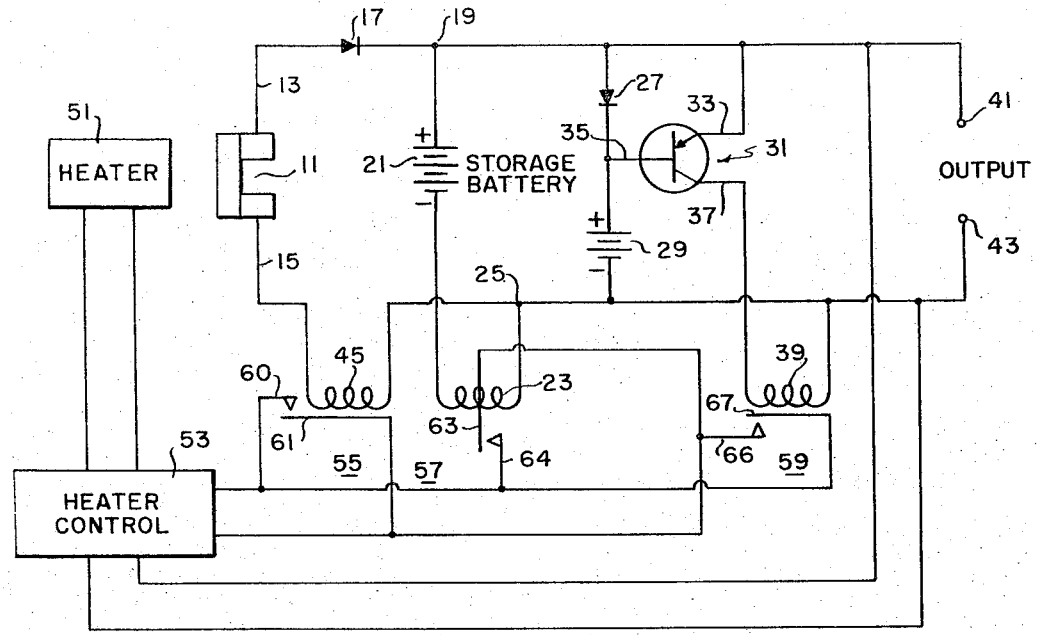

Nov. 28, 1967 N. E. LINDENBLAD 3,355,652

COMBINED THERMOELECTRIC OPERATOR AND STORAGE BATTERY OPERATION

Filed July 14, 1965

INVENTOR.
NILES E. LINDENBLAD
BY
ATTYS.

United States Patent Office 3,355,652
Patented Nov. 28, 1967

3,355,652
COMBINED THERMOELECTRIC OPERATOR AND STORAGE BATTERY OPERATION
Nils E. Lindenblad, Princeton, N.J., assignor, by mesne assignments, to the United States of America as represented by the Secretary of the Navy
Filed July 14, 1965, Ser. No. 472,069
13 Claims. (Cl. 320—39)

The present invention relates to a thermoelectric generator and more particularly to a thermoelectric generating system for recharging a storage battery at a remote location and for aiding the battery in supplying energy to a load.

The desirability of providing rechargeable energy sources at given locations has been established. Very briefly, rechargeable energy sources such as batteries are utilized to operate warning beacons, isolated communication stations, and monitoring systems etc. Heretofore, batteries have been intermittently recharged by solar energy, by motor generator sets or by power taken from a power company. The prior art battery charging systems generally operate satisfactorily but contain inherent limitations. For example, solar energy battery charging systems depend on the sun and are not operative at night or on cloudy days; motor generator sets are capable of operating over a 24 hour period but are subject to mechanical failures and to replacement of mechanical parts which wear out; and power lines are expensive to build and maintain for the delivery of small amounts of electrical power.

The present invention overcomes the afore-mentioned difficulties by containing a minium number of moving parts which are capable of operating automatically at any time of the day or night for maintaining battery in a fully charged condition. In addition any number of conveniently available fuels may be utilized in the heater for providing the heat. Specifically a thermoelectric generator converts some of the energy present in the heat into electrical energy for charging a storage battery. The heater is turned on and off by a heater control which is operated by anyone of a plurality of sensors each of which is responsive to the load condition, state of the battery charge, or the flow of a current charging the storage battery.

An object of the invention is to provide a thermoelectric generator, battery, heater and heater controls for forming a self-sufficient system.

Another object of the invention is to provide a thermoelectric generator and battery system for unattended remote operation.

Still another object of the invention is to provide a charging source for a battery which operates quietly and reliably.

A further object of the invention is to provide a battery charging system for remote operation which does not utilize an internal combustion engine.

Figure 2:
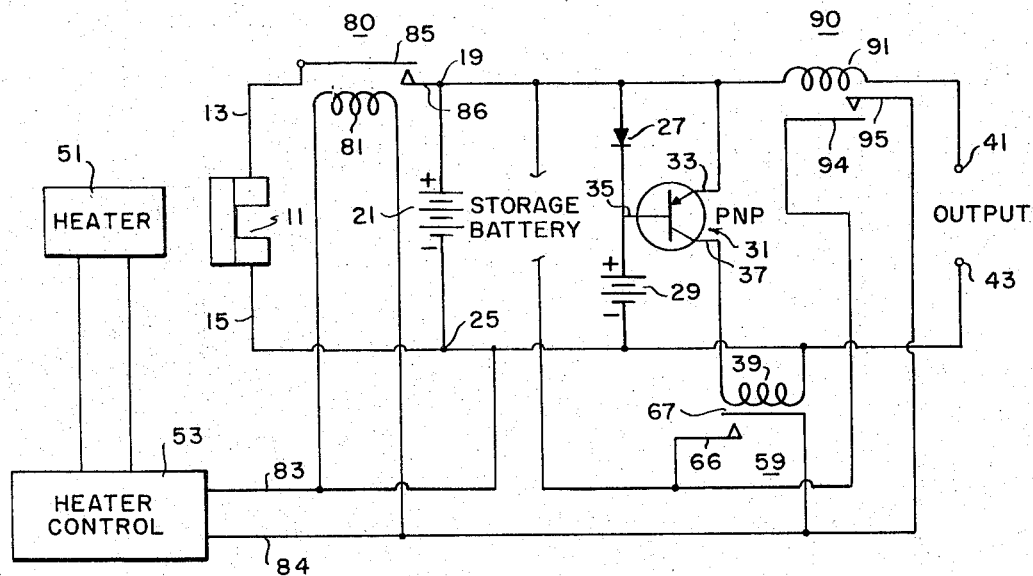

Other objects and many of the attendant advantages of this invention will be readily appreciated as the same becomes better understood by reference to the following detailed description when considered in connection with the accompanying drawings wherein:

FIG. 1 is a circuit digaram of an automatic charging system for storage batteries in accordance with the invention; and FIG. 2 is a circuit diagram of a modified form of a charging system for storage batteries embodying the present invention.

Referring to FIG. 1 a thermoelectric generator 11 has a positive output terminal 13. The positive terminal 13 of the thermoelectric generator 11 is connected to the anode of diode 17. The cathode of diode 17 is connected to a junction point 19. A battery 21 has its positive terminal connected to junction point 19 and its negative terminal to one end of a relay control winding 23. The other end of relay control winding 23 is connected to a junction point 25. A diode 27 has its anode connected to the junction point 19 and its cathode connected to the positive terminal of a battery 29. The battery 29 is a reference battery and has a smaller voltage across its terminals than battery 21 for reasons which will become evident hereafter. The battery 29 has its negative terminal connected to the junction point 25.

A PNP transistor 31 is provided having an emitter electrode 33, a base electrode 35 and a collector electrode 37. The emitter electrode 33 of transistor 31 is connected to the junction point 19. The base electrode 35 of transistor 31 is connected to the cathode of diode 27 and the collector electrode 37 of transistor 31 is connected to one end of a relay control winding 39. The other end of the relay control winding 39 is connected to the junction point 25. One of the output terminals 41 is connected to junction point 19 and the other output terminal 43 is connected to the junction point 25. A relay control winding 45 of the relay 55 has one of its ends connected to the negative output terminal 15 of the thermoelectric generator 11 and its other end connected to the junction point 25.

A heater 51 is provided with a heater control 53 of the conventional type for igniting and cutting off the heater. The electrical power required for the operation of the heater control is supplied from the output terminals 41 and 43. The heater control is activated by any one of the three relays 55, 57 or 59 in a manner to be discussed during a cycle of operation to appear hereafter. The relay 55 has a pair of contacts 60 and 61 which are normally open, the relay 57 is a polarized relay and has a pair of contacts 63 and 64 which are normally open and the relay 59 has a pair of contacts 66 and 67 which are normally closed.

The operation of FIG. 1 is as follows with no load current being supplied and the storage battery 21 fully charged the transistor 31 is conductive due to the voltage difference of batteries 21 and 29 holding the relay 59 open. When the voltage of the storage battery 21 becomes low, the emitter to base potential of the transistor 31 becomes low causing the transistor to approach cut-off thereby causing the relay coil 39 to become de-energized. The relay contacts close causing the heater control to tunn the heater on.

Supplying heat energy to the thermoelectric generator 11 cause the generator to generate electrical power for charging the storage battery 21. When the voltage of the storage battery 21 increases the emitter to base potential of the transistor 31 increases until the transistor 31 conducts heavily enough to energize the relay coil 39. Energizing the relay coil 39 opens the relay contacts causing the heater control 53 to cut-off the heater 51 thereby causing the thermoelectric generator 11 to stop operating.

The polarized relay 57 will have its contacts 63 and 64 in the closed position during the time the battery 21 is receiving charging current thereby assuring that the thermoelectric generator will stay on during this time period. In the event that no current flows through the relay control winding 23 or that the battery is discharging then the relay contacts 63 and 64 are open. In the event the battery is not adequate to supply the demands of the load then the relay 55 will close the contacts 60 and 61 thereby keeping the heater control 53 in the on condition. The diode 17 prevents current from flowing out of the storage battery 21 through the thermoelectric generator 11.

Referring to FIG. 2 identical components present in FIG. 1 will have the same numerical indicia as in FIG. 1 and operates in the identical fashion. An on control relay winding 81 has one of its ends connected to one of heater control inputs 83 and its other end connected to the other heater control input 84. The relay 80 has a pair of contacts 85 and 86 and the switch formed by contacts 85 and 86 replaces the diode 17 in FIG. 1. Relay 90 is provided with a control winding 91 which has one of its ends connected to the junction point 19 and its other end connected to the output terminal 41. The relay 90 is provided with a pair of contacts 94 and 95 which are connected in parallel with contacts 66 and 67 of the relay 59. The contact 66 of the relay 59 is connected to the junction point 19 and the input 83 of the heater control is connected to the junction point 25.

The charging system illustrated in FIG. 2 operates as follows: When no current is delivered to the output terminal and the heater is off, then the relay 80 has its contacts 85 and 86 in the open position. When the heater is on then the relay 80 has its contacts 85 and 86 in the closed position. The relay 59 and the transistor 31 both operate as heretofore described in connection with FIG. 1. Whenever the relay 59 has its contacts 66 and 67 in closed position then the relay 81 is energized closing its contacts 85 and 86 as well as turning on the heater control. When electrical power is supplied to the load the relay 90 is energized closing contacts 94 and 95 which energizes the relay 80 and the heater control 53 and starts the heater 51. When the electrical power ceases to flow to the load, then the electrical current ceases to flow in relay control winding 91 de-energizing the relay 90 and opening the contacts 94 and 95 cutting off the heater control 53 and the heater 51.

Obviously many modifications and variations of the present invention are possible in the light of the above teachings. It is therefore to be understood that within the scope of the appended claims the invention may be practiced otherwise than as specifically described.

What is claimed is:

1. A system for maintaining the charge on a storage battery and for delivering current to a load comprising:
    a thermoelectric generating means;
    a battery, said battery being connected to said thermoelectric generating means;
    means for keeping said thermoelectric generator on as long as a load demands current in excess of what said battery can normally supply; and
    means for controlling said thermoelectric generating means in response to the state of charge of said battery whereby said thermoelectric generator replenishes the charge on said battery.

2. A system for maintaining the charge on a battery and for delivering current to a load as defined in claim 1 but further characterized by having said means for controlling said thermoelectric generating means comprising a conducting transistor for sensing the state of the charge on said battery and a relay having a control winding connected in series with said transistor for actuating a heater control.

3. A system for maintaining the charge on a storage battery and for delivery current to a load comprising:
    a thermoelectric generating means;
    a battery;
    means for preventing current from flowing from said battery through said thermoelectric generating means connected in a series circuit with said battery and said thermoelectric generating means;
    heater means;
    means for keeping said heater on as long as a load demands current in excess of what said battery can normally supply; and
    means responsive to the charge on said battery for turning said heater on connected to said battery whereby said thermoelectric generator recharges said battery as well as supplying current to a load.

4. A system for maintaining the charge on a battery and for delivering current to a load as defined in claim 3 but further characterized by having said means for preventing current from flowing from said battery through said thermoelectric generating means comprising a diode.

5. A system for maintaining the charge on a battery and for delivering current to a load as defined in claim 3 but further characterized by having said means for preventing current from flowing from said battery through said thermoelectric generator comprising a relay.

6. A system for maintaining the charge on a battery and for delivering current to a load comprising:
    a thermoelectric generator;
    a battery having a pair of terminals, one of said terminals being connected to said thermoelectric generator;
    an electronic valve means having an input control and output electrodes, said input electrode being connected to one of said battery terminals;
    a reference battery means having a terminal, said electronic valve control means being connected to said terminal of said reference battery means;
    means for generating heat inoperative relation to said thermoelectric generator;
    means for keeping said heater on as long as a load demands current in excess of what said battery can normally supply; and
    means responsive to said electronic valve for turning the heat generating means on and off being connected to said electronic valve output electrode whereby said heating generating means is turned on and off in response to the level of charge of said battery.

7. A system for maintaining the charge on a battery and for delivering current to a load as defined in claim 6 but further characterized by having said electronic valve comprising a transistor.

8. A system for maintaining the charge on a battery and for delivering current to a load as defined in claim 7 but further characterized by having means for preventing current from flowing from said battery through said thermoelectric generating means comprising a diode which connects said one of said battery terminals to said thermoelectric generator whereby said battery does not discharge through said thermoelectric generator.

9. A system for maintaining the charge on a battery and for delivering current to a load as defined in claim 7 but further characterized by having means for preventing current from flowing from said battery through said thermoelectric generating means comprising a relay having a pair of contacts which are open when said thermoelectric generator is off and are closed when said thermoelectric generator is on, one of said thermoelectric generator ends being connected to said one of said battery terminals through said relay contacts whereby said battery does not discharge through said thermoelectric generator in a backward direction.

10. A system for maintaining the charge on a battery and for delivering current to a load as defined in claim 6 but further characterized by having means for preventing current from flowing from said battery through said thermoelectric generating means comprising a relay having a pair of contacts which are open when said thermoelectric generator is off and are closed when said thermoelectric generator is on, one of said thermoelectric generator ends being connected to said one of said battery terminals through said relay contacts whereby said battery does not discharge through said thermoelectric generator.

11. A system for maintaining the charge on a battery and for delivering current to a load as defined in claim 6 but further characterized by having means for preventing current from flowing from said battery through said thermoelectric generating means comprising a diode which connects said one of said battery terminals to said thermoelectric generator whereby said battery does not discharge through said thermoelectric generator.

12. A system for maintaining the charge on a battery and for delivering current to a load comprising:
  a thermoelectric generator having a pair of terminals;
  a battery having a first and second terminals;
  a first diode being connected between one of said thermoelectric generator terminals and said first battery terminals;
  a transistor having a base electrode, a collector electrode and an emitter electrode connected to said first battery terminal;
  a second diode connected between said base electrode of said transistor and said first battery terminal;
  a reference battery having a pair of terminals one of which being connected to said base electrode of said transistor;
  a heater;
  a heater control means having a pair of inputs for turning said heater on and off connected to said heater having a pair of inputs;
  a first relay having a pair of contacts each contact being connected to a heater control input and said relay having a control winding having a pair of ends, one of said ends of said first relay control winding being connected to the other end of said thermoelectric generator and the other end of said first relay control winding being connected to the other end of said reference battery;
  a second relay having a control winding and a pair of contacts which are connected in parallel with said first relay contacts and said second relay control winding having one of its ends connected to the other end of said battery and the other end of said second relay control winding being connected to said other end of said other terminal of said reference battery; and
  a third relay having a control winding and a pair of contacts, said contacts being connected in parallel with said first relay contact and said second relay contact and said third relay control winding having one end connected to said collector electrode and its other end connected to said other end of said reference battery.

13. A system for maintaining the charge on a battery and for delivering current to a load comprising:
  a thermoelectric generator having a pair of terminals;
  a battery to be charged having a pair of terminals, one of said terminals being connected to one of said thermoelectric generator terminals;
  a heater;
  control means connected to said heater for causing said heater to turn on and off having a pair of inputs, one of said control means inputs connected to one of said battery terminals;
  a first relay having a control winding having a pair of ends being respectively connected to said control means inputs, said first relay having a pair of contacts, one of said contacts being connected to the other end of said thermoelectric generator terminals and the other one of said contacts being connected to said other one of said battery terminals;
  a transistor having a base electrode, a collector electrode and an emitter electrode being connected to the other one of said battery terminal;
  a diode connected between the other one of said battery terminals and said base electrode of said transistor;
  a reference battery connected between said base electrode of said transistor and said first battery terminal;
  a second relay having a control winding connected between said collector electrode of said transistor and said first battery terminals, said second relay having a first and second contact, said first contact being connected to the other end of said battery terminals and said second contact being connected to the other one of said heater control means inputs; and
  a third relay having a first and second contact, said first contact of said third relay being connected to said first contact of said second relay and said second contact of said third relay being connected to said second contact of said second relay, said third relay having a control winding being connected to said emitter electrode whereby delivering current to a load causes said third relay contacts to close energizing said heater control means and said first relay.

References Cited

UNITED STATES PATENTS

| | | | |
|---|---|---|---|
| 565,727 | 8/1896 | Dickerson | 322—2 X |
| 2,362,259 | 11/1944 | Findley | 322—2 X |
| 3,082,370 | 3/1963 | Hallidy | 320—39 X |
| 3,174,534 | 3/1965 | Weber | 158—125 |
| 3,174,535 | 3/1965 | Weber | 158—125 |

JOHN F. COUCH, *Primary Examiner.*

S. WEINBERG, *Assistant Examiner.*